Aug. 17, 1937.  J. M. BURNHAM  2,090,341
PECAN HULLER
Filed Aug. 26, 1935
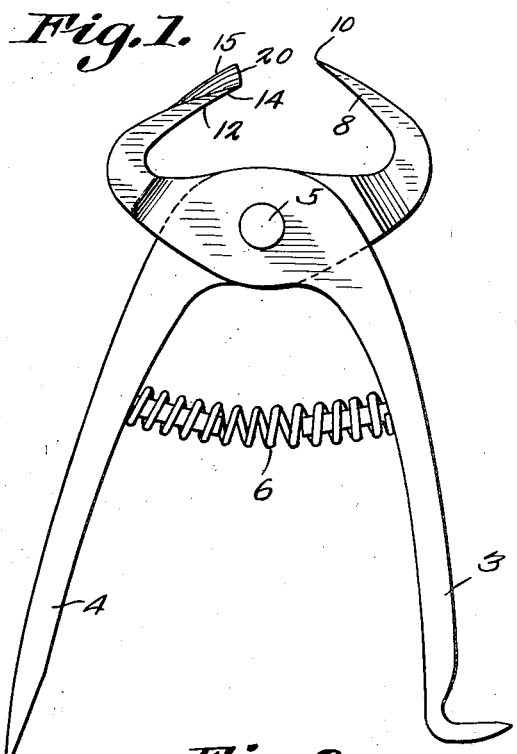
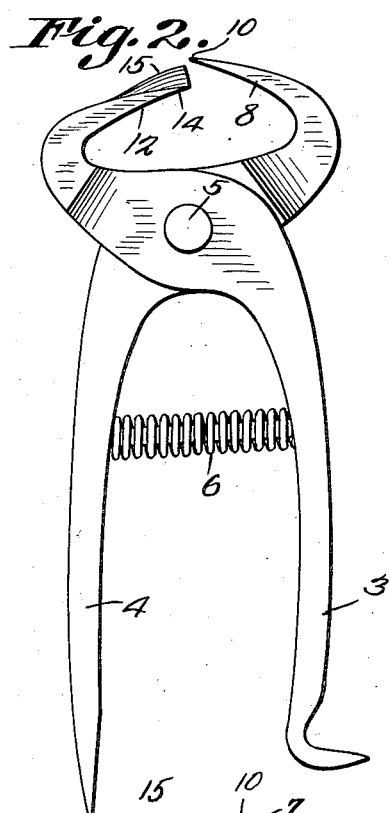
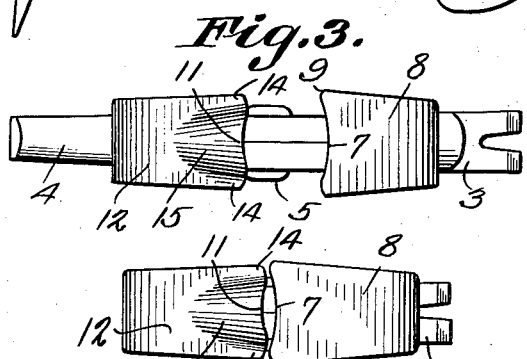
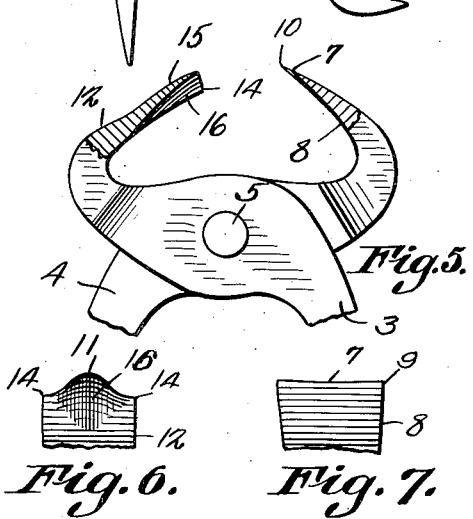
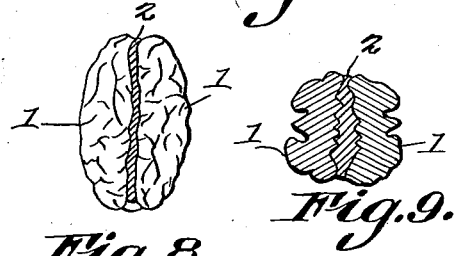
Inventor
J. M. Burnham
By C. A. Snow & Co.
Attorneys.

Patented Aug. 17, 1937

2,090,341

UNITED STATES PATENT OFFICE 2,090,341

PECAN HULLER

John Morton Burnham, Marble Falls, Tex., assignor of forty-nine one-hundredths to T. J. McElhenny, Austin, Tex.

Application August 26, 1935, Serial No. 38,002

2 Claims. (Cl. 146—13)

One object of the invention is to provide a tool which may be used advantageously to cut through the shell of a pecan, around the kernel, thereby freeing the divider from the shell of the pecan, and leaving the divider in place, between the constituent parts of the meat or kernel of the nut.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows, in side elevation, a tool constructed in accordance with the invention, the jaws being open;

Fig. 2 is a side elevation wherein the jaws are shown closed;

Fig. 3 is a top plan, the jaws being open;

Fig. 4 is a top plan, the jaws being closed;

Fig. 5 is a view similar to Fig. 1, parts being broken away, and parts of the jaws being shown in section;

Fig. 6 is an elevation showing one of the jaws;

Fig. 7 is an elevation showing the other of the jaws;

Fig. 8 is an elevation showing the kernel of the pecan nut after the divider has been cut free from the shell of the nut;

Fig. 9 is a cross section of the article shown in Fig. 8.

In order that the utility of the tool forming the subject matter of this application may be appreciated readily, in order that the tool may not be confused with many devices in the cutting pliers art, and in order that the specific field in which the tool is employed may be understood clearly, it is to be observed that a pecan nut comprises a shell and a kernel within the shell, the kernel embodying two parts 1 (Figs. 8 and 9), separated almost completely by a woody divider 2, joined at its periphery to the shell.

According to known methods, the shell of the pecan is mashed with a hammer, or by means of a nut cracker, the kernel (always more or less damaged) is set free, and the parts 1 of the kernel are separated from each other and from the divider 2. With a view to avoiding damage to the kernel, and a separation of the parts of the kernel, resulting from the known cracking process, the nut sometimes is soaked before it is opened. That takes work, and in a great many instances fails to accomplish the end in mind. Moreover, if the kernel is broken, or if the parts 2 of the kernel are separated, the kernel will not keep so well as would be possible if it is permitted to remain in the intact form of Figs. 8 and 9, the divider 2 being left in place until the person using the kernel separates its constituent parts 1.

The tool forming the subject matter of this application makes it possible for an operator to produce a pecan kernel having its outer surface intact, the kernel comprising parts 1 between which the natural woody divider 2 of the nut is held in its original position, the periphery of the divider being exposed and freed from the shell of the nut, the kernel, as an article of manufacture, being something which cannot be claimed in this application, due to the rules of the Patent Office respecting division.

The tool preferably is made of metal throughout, and embodies crossed levers or handles 3 and 4, connected at their place of crossing by a pivot element 5. The manufacturer will use his discretion as to the spring means for separating the handles 3 and 4, the simple mechanism shown at 6 being suggested as satisfactory.

The lever 4 carries an overhanging jaw 8, provided in its free end with a shallow recess 7, which forms pointed fingers 9 at the sides of the jaw, the jaw being brought to a sharpened edge 10, throughout its entire width.

The lever 3 carries an overhanging jaw 12, provided in its free end with a shallow recess 11, which forms depth gauges 14 at the sides of the jaw. The jaw 12 is provided intermediate its side edges with a projection 15 (functionally a groover and cutter), and the depth gauges 14 are located on opposite sides of the groover and cutter 15. The inner surface of the jaw 12 is outwardly concaved, as seen at 16 in Fig. 5, the groover and cutter 15 being brought to a sharp edge 20. The curve of the jaw 12 (Fig. 2) is a little sharper than the curve of the jaw 8, and the jaw 12 tends to work toward the inside of the jaw 8, or more pronouncedly toward the pivot element 5 than does the jaw 12.

In practical operation, the first step is to cut off one end of the pecan nut by means of the sharpened edges 10 and 20, the handles 3 and 4 being operated lever-wise to accomplish that result. When the end of the nut is cut off, a little of the divider 2 is exposed, and the operator thereby is advised as to the plane in which the divider 2 is located. After the plane in which the divider 2 is located has been observed, the operator can cut a groove around the shell of the nut in such a way as to separate the shell of the nut into two parts, the divider 2 at the same time being cut free from the shell of the nut, and the divider remaining in place between the parts 1 of the kernel, as in Fig. 8, the kernel being freed, in the natural condition of that figure, from the shell.

In severing the shell of the nut and in cutting the divider 2 free from the shell, one end of the nut is placed in the recess 7, against the fingers 9. Since the fingers 9 are sharp-edged, they acquire a firm hold on the shell. Sometimes the shell engages the edge of the recess 7 alone, and again the shell may engage the fingers 9 alone, that being a matter which is determined by the size and shape of the nut, considered relatively to the parts 7 and 9. If, as is many times the case, the nut engages both the fingers 9 and the edge of the recess 7, a peculiarly efficient abutment for the nut is afforded, during the cutting operation now to be explained.

The cutting operation is brought about by moving the jaw 12 toward the jaw 8, by means of the lever 3, both of the levers 3 and 4 being held in one hand. The projection 15 cuts away a portion of the shell of the nut, in line with the divider 2, and severs the edge of the divider from the shell. By shifting the tool circumferentially of the nut, the shell is cut away step by step, and the divider is freed step by step from the shell, until finally the product of Figs. 8 and 9 results. During the cutting operation, the depth gauges 14, cooperating with the outer surface of the shell, prevent the groover and cutter 15 from going far enough through the shell to chisel into the kernel and damage it.

Having thus described the invention, what is claimed is:

1. In a device for cutting a slot around a nut which has a shell, a kernel, and a divider between portions of the kernel, thereby to sever the shell into removable parts and to free the divider peripherally from the shell; cooperating first and second jaws, and means for mounting the jaws for movement toward and away from each other, with the working end of the first jaw operating inwardly of the working end of the second jaw, the working end of the second jaw constituting an abutment for the nut, and the working end of the first jaw being supplied with a sharpened slot-cutter of concavo-convex form, the cutter convexing toward the first jaw, transversely of the first jaw, the convexity of the cutter being sufficiently great so that the cutter will cut entirely through the shell of the nut, thereby severing the shell into removable parts and freeing the divider from the shell, as aforesaid.

2. The device of claim 1, further characterized by the fact that the working end of the second jaw has a sharpened edge, convexed inwardly with respect to the length of the second jaw and defining fingers at the sides of the second jaw, the convexed edge facilitating an abutment hold on nuts of small diameter, and the fingers facilitating an abutment hold on nuts of larger diameter.

JOHN MORTON BURNHAM.